(12) United States Patent
Nagamura

(10) Patent No.: US 7,994,228 B2
(45) Date of Patent: Aug. 9, 2011

(54) ION-PAIR CHARGE-TRANSFER COMPLEX POLYMER AND PHOTORESPONSIVE-ELECTRORESPONSIVE MATERIAL COMPRISING THE SAME

(75) Inventor: Toshihiko Nagamura, Fukuoka (JP)

(73) Assignee: Kyushu University, National University Corporation, Fukuoka (JP)

( * ) Notice: Subject to any disclaimer, the term of this patent is extended or adjusted under 35 U.S.C. 154(b) by 319 days.

(21) Appl. No.: 12/441,193

(22) PCT Filed: Sep. 14, 2007

(86) PCT No.: PCT/JP2007/067920
§ 371 (c)(1),
(2), (4) Date: Mar. 13, 2009

(87) PCT Pub. No.: WO2008/032818
PCT Pub. Date: Mar. 20, 2008

(65) Prior Publication Data
US 2009/0286891 A1    Nov. 19, 2009

(30) Foreign Application Priority Data
Sep. 15, 2006   (JP) .................................. 2006-250424

(51) Int. Cl.
*B01J 39/20*   (2006.01)
*C08F 18/22*   (2006.01)
*C08F 244/00*  (2006.01)
(52) U.S. Cl. ........................... 521/38; 526/246; 526/267
(58) Field of Classification Search .................... 521/38; 526/246, 267
See application file for complete search history.

(56) References Cited

FOREIGN PATENT DOCUMENTS
JP         05273691 A   * 10/1993
JP      2002328349 A   * 11/2002
* cited by examiner

*Primary Examiner* — Michael M Bernshteyn
(74) *Attorney, Agent, or Firm* — Fay Sharpe LLP

(57) ABSTRACT

Provided is a novel ion-pair charge-transfer complex polymer suitable for use as a photo-functional material which shows extremely fast photoresponses in the wide wavelength range from visible to near infrared regions, and thermally stable, wherein the acceptor is a substituted bipyridinium cation expressed by the formula (I) below. In the formula, X represents a group bonded at the 4- or 2-position relative to the nitrogen atoms of the bipyridinium group and selected from the group consisting of phenyl, biphenyl, thienyl, bithienyl, terthienyl, furyl, fluorenyl, pyrenyl, perylenyl, and vinyl groups, or X may not be present so that the pyridinium groups are directly connected; and Z represents a polymer preferably from the ring-opening polymerization of an oxazoline derivative (e.g. one substituted with phenyl group). The anion as the donor is selected, for example, from chloride, bromide, iodide, tetraphenylborate or derivatives thereof.

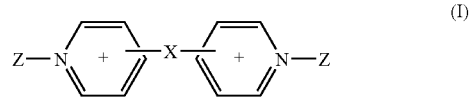

(I)

7 Claims, 2 Drawing Sheets

ION-PAIR CHARGE-TRANSFER COMPLEX POLYMER AND PHOTORESPONSIVE-ELECTRORESPONSIVE MATERIAL COMPRISING THE SAME

TECHNICAL FIELD

The present invention relates to a novel ion-pair charge-transfer complex polymer for use as a photo-functional material and the like in the field of information technology and related technologies.

BACKGROUND ART

Substances which will give rise to a color change (absorption spectral change) or the like upon photoirradiation are being used for extensive development of a variety of functional materials for use in recording, display and switching.

For example, in high-density recording, the properties of the optical device, such as the transmittance used in the system, make it desirable to use a material which causes a change in the absorption spectrum or refractive index in the visible or near-infrared region with a short-wavelength light such as one as short as about 400 nm. In view of the increasing speed of information processing, materials are required that exhibit a very high speed response in the near-infrared region, i.e., the wavelength region for optical telecommunication. In addition, for application to electronic paper and the like, there are eagerly awaited materials which generate a color change in response not only to light but also to electric or electronic signals. However, very few materials are found which fully satisfy these requirements.

An ion-pair charge-transfer complex is a charge-transfer complex composed of a cationic component which serves as the electron acceptor and an anionic component which constitutes the counter ion and serves as the electron donor. The proximity of the donor and the acceptor attributable to an oxidation-reduction reaction in an ion-pair charge-transfer (sometimes abbreviated as IPCT hereinafter) complex causes a face-to-face charge-transfer interaction in addition to the coulombic interaction, and therefore the complex will develop new types of colors and properties which are not observed at all with the cation or anion alone. In the case of an ion-pair charge-transfer complex or an extended aromatic conjugated system such as X in the formula (I) set out later, photoirradiation corresponding to the absorption by the cation alone will give rise to a photoinduced electron transfer from the anion to cation thereby producing a one-electron reductant (radical cation).

Previously, the present inventors invented an IPCT complex of a "polymer" composed of bipyridinium cation as the backbone (Japanese Patent No. 3720277 "Polymeric photoresponsive materials and elements utilizing photoinduced electron transfer reaction": Patent Reference No. 1). This IPCT complex polymer is suitable for use as a photo-functional material, as it causes, upon photoirradiation, an absorption spectral change (color change) at the visible to near-infrared region over a wide wavelength range for a wide range of response time. The material has the additional advantage of being easy to make into film because it is a polymer. However, the drawback is that it has a low glass-transition temperature making it difficult to apply the material to a device.

Patent Reference No. 1: Japanese Patent No. 3720277 "Polymeric photoresponsive materials and photoresponsive elements utilizing photoinduced electron transfer reaction".

DISCLOSURE OF THE INVENTION

Problems to be Solved by the Invention

The object of the present invention is to provide a new type of ion-pair charge-transfer complex polymer having a thermal stability while retaining useful features as a photo-functional material.

After extensive studies, the present inventors found that the above-mentioned object can be accomplished by a complex polymer in which the polymer backbone (main chain) has a contrived structure, to be bonded with bipyridinium cation and accomplished the present invention.

Thus, according to the present invention, there is provided an ion-pair charge-transfer complex polymer with excellent thermal stability, wherein the acceptor is a substituted bipyridinium cation expressed by the general formula (I) below:

[CF1]

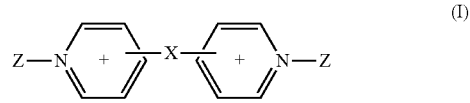

(I)

In the formula (I), X represents a group bonded at the 4- or 2-position relative to the nitrogen atoms of the bipyridinium group and selected from the group consisting of phenyl, biphenyl, thienyl, bithienyl, terthienyl, furyl, fluorenyl, pyrenyl, perylenyl, and vinyl groups, or X may not be present so that the pyridinium groups are directly connected to each other; and Z represents a polymer from the ring-opening polymerization of an oxazoline derivative expressed by the general formula (II) below, or a polymer from the addition polymerization of a vinylether derivative expressed by the general formula (III) below or an indene derivative expressed by the general formula (IV) below.

[CF2]

(II)

[CF3]

(III)

[CF4]

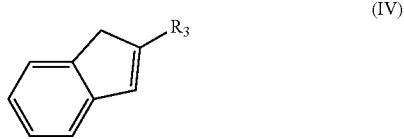

(IV)

In the formula (II) $R_1$ represents a fused ring or non-fused ring functional group (including a substituted functional group) of one through three five-membered or six-membered rings (including heterocyclic rings) connected to each other, or an alkyl group (including a substituted alkyl group) having one through three carbon atoms, in the formula (III) $R_2$ represents a bulky aliphatic polycyclic functional group such as adamantil group or tricyclodecyl group, and in the formula (IV) $R_3$ represents hydrogen atom, methyl group or ethyl group.

BEST MODE FOR CARRYING OUT THE INVENTION

Figure 1:
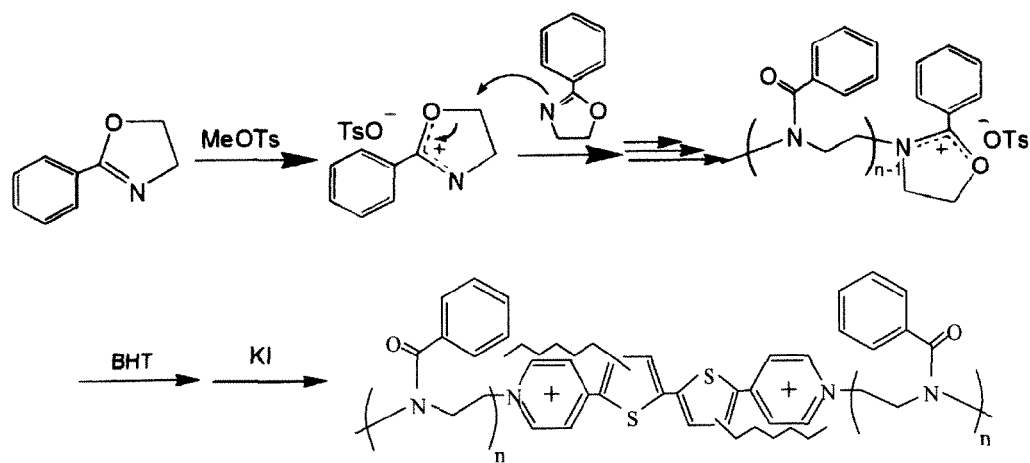
FIG. 1 outlines a reaction scheme for synthesizing an ion-pair charge transfer complex polymer of the present invention.

The IPCT complex polymer disclosed previously by the present inventor in Japanese Patent No. 3720277 (Patent Reference No. 1) is one in which the portion corresponding to Z is poly(tetramethylenoxy) group. This IPCT complex poly-

[CF4]

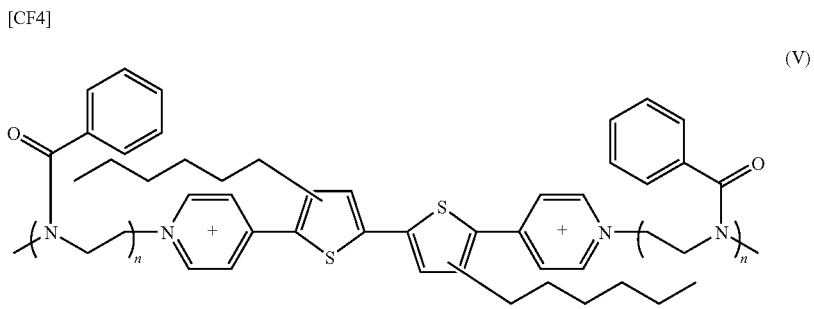

(V)

mer has a drawback in that it has a low glass transition temperature. For example, when the counter anion is tetrakis[3,5-bis(trifluoromethyl)phenyl]borate, the resultant complex polymer exhibits a glass transition temperature (Tg) of 185K and assumes a rubbery state at room temperature which renders application to a device difficult.

By contrast, in the ion-pair charge-transfer (IPCT) complex polymer of the present invention, there are employed, as the Z in the above-mentioned formula (I), a polymer from the ring-opening polymerization of an oxazoline derivative [the formula (II)], or a polymer from the addition polymerization of a vinylether derivative [the formula (III)] or an indene derivative [the formula (IV)], wherein $R_1$ of the formula (II) represents a fused ring or non-fused ring functional group composed of one through three five-membered or six-membered rings (including heterocyclic rings) connected each other, or an alkyl group (including a substituted alkyl group) having one through three carbon atoms, and wherein $R_2$ of the formula (III) represents a bulky aliphatic polycyclic group such as adamantyl group or tricyclodecyl group. The IPCT complex polymer of such a structure has a high glass transition temperature, i.e, generally 100° C. (373K) or higher. It is considered that a stable glassy state can be maintained up to a high temperature because of R1 or R2 bonded as the side chains to the polymeric moiety of the complex, or the rigid or bulky functional or atomic groups present in the polymeric backbone.

Preferable Z is a polymer from the ring-opening polymerization of an oxazoline derivative expressed by the formula (II). Preferable examples of $R_1$ include 1 fused ring functional groups composed of one through three five-membered or six-membered rings (including heterocyclic groups) such as phenyl, naphthyl, benzimidazole, furyl, thienyl, pyridyl, indolyl and the like, derivative thereof substituted with various substituents (such as halogen atom, methyl, alkoxy, ester, nitro, hydroxyl, carboxyl, maleimide and succinimide, or perfluoroethyl.

In the formula (I), X represents a group bonded at the 4- or 2-position relative to the nitrogen atoms of the bipyridinium group and selected from the group consisting of phenyl, biphenyl, thienyl, bithienyl, terthienyl, furyl, fluorenyl, pyrenyl, perylenyl, and vinyl groups, or X may not be present so that the pyridinium groups are directly connected to each other, among which the most preferable example is bithienyl group.

An example of the substituted bipyridinium cation (acceptor) belonging to the formula (I) for composing the IPCT complex polymer of the present invention includes, but is not limited to, the following one expressed by the formula (V) below:

While as an anion, i.e. a counter ion to the substituted bipyridinium cation mentioned above in the IPCT complex polymer of the present invention, any can be applied that is capable of serving as a donor with the cation serving as an acceptor, preferable examples include chloride, bromide, iodide, tetraphenylborate and derivatives thereof. By the derivative of tetraphenylborate is meant a tetrakis[3,5-bis(trifluoromethyl)]phenylborate with an electron-accepting functional group (e.g. trifluoromethyl). In addition, there can be used a fused aromatic molecules composed of one through three five-membered or six-membered rings (including heterocyclic rings) connected to each other (e.g. naphthalene sulfonate) and having an anionic substituent.

The IPCT complex polymer of the present invention can be synthesized by managing known reactions. For example, the synthesis of an IPCT complex polymer comprising a polymer derived from an oxazoline derivative of the formula (II) is detailed in the Example given later. An IPCT complex polymer comprising a polymer from a vinylether derivative of the formula (III) can be prepared, for example, by allowing the vinylether derivative monomer solution in an appropriate solvent (e.g. toluene) to react with hydrogen chloride and zinc chloride successively, and finally with a 4,4'- or 2,2'-bipyridine derivative. An IPCT complex polymer comprising a polymer from an indene derivative can be prepared, for example, by allowing the indene derivative monomer solution in an appropriate solvent (e.g. dichloromethane) to react with trichloroacetate solution and a tin tetrachloride solution successively, and finally with a 4,4'- or 2,2'-bipyridine derivative.

The IPCT complex polymer of the present invention may be processed, for example, into a film by known methods (e.g. the cast coating method or the spin coating method) for use as functional materials for the respective purposes.

As compared with the conventional photoresponsive materials, the most characteristic feature of a material from the IPCT complex polymer of the present invention resides in a higher glass transition temperature, thereby ensuring an excellent thermal stability.

Furthermore, the material of the present invention based on IPCT is not only photo-responsive but also electro-responsive: As compared with an ordinary type of photochromism in which a color change occurs through reorganization of chemical bonding states, coloration can be easily controlled diversely over a wide range according to the present invention because the exchange of one single electron takes place optically between the ion pair resulting in an extremely fast response time. In addition, the material of the present invention can be advantageously utilized, for example, in the active layer of electronic paper or an optical switch, because the change in color or refractive index can be electrically varied and held.

The charge-transfer interaction in the IPCT complex polymer of the present invention depends upon redox potential of ions. Thus, by changing the counter ion, the photoresponsibility and its response time can be varied and such photoresponsibility can be rendered either reversible or irreversible. For example, by employing tetrakis[3,5-bis(trifluoromethyl)] phenylborate having trifluoromethyl group as the counter ion, there can be obtained a material which exhibits reversible absorption change with stationary light, whereas an irreversibly responsive material is obtained when tetraphenylborate not possessing such substituent is used. In addition, when a halide ion is employed, there is obtained a material which does not exhibit absorption change with stationary light but shows transient photoresponsibility only for a very short period of time.

The color change with the IPCT complex polymer of the present invention results from one-electron reduced state of the acceptor caused by electron transfer through a photoirradiation or voltage application, and thus the color can be easily controlled over a wide range by changing the structure of the polymer. The three primary colors in the visible range, which are vital to the active layer of full-color electronic paper, can be realized by employing the following functional groups as X in the formula (I):

(1) Cyan (violet, greenish blue): no X or bithienyl.
(2) Magenta (reddish purple): thienyl or furyl.
(3) Yellow (yellow): biphenyl.

As in the case of the material disclosed in Japanese Patent No. 3720277 (Patent Reference No. 1), a material from the IPCT complex polymer of course exhibits absorption spectral change (color change) over a wide wavelength range of from visible to near infrared region through a photoirradiation or electric field. The lifetime of such color changed through the photoirradiation can be controlled over a wide range of time from picoseconds to infinity, depending upon the counter anion employed, temperature and microscopic environment.

The features of the present invention will be described in a more concrete manner with reference to the following working examples, which are not for restricting the present invention.

Example 1

Synthesis of IPCT Complex Polymer

As an IPCT complex polymer according to the present invention, there was synthesized, under the reaction scheme as shown in FIG. 1, 2-phenyl-2-oxazoline polymer (a polymer of the formula (IV)) containing 5,5'-di(4-pyridyl)-4,4'-dihexyl-2,2'-bithiophene (hereinafter abbreviated as BHT).

The two types of monomers, as the starting materials and the reaction solvent, were subjected to a reflux operation and a distillation, just before use. The reaction vessel was warmed by flowing dry nitrogen, to which were added 2-phenyl-2-oxazoline 8.82 grams, butyronitrile 7.71 mL (milliliter) as the solvent, and methyltosylate 0.31 grams as the reaction initiator, followed by a reflux operation at 145° C. with a microwave reactor (90 W). Twenty minutes after starting the reflux, there was added BHT 0.78 grams dissolved in 6.5 mL of butyronitrile with a metallic needle through the top of the reflux tube. Then, the polymerization was carried out for three hours. The ion-exchange of counter ion took place from tosylate to iodide and reprecipitation was carried out from ethyl acetate resulting in the formation of deep yellow polymer powder. The number average molecular weight of the polymer was 4900 in which the ratio of the weight average molecular weight to the number average molecular weight was 1.11.

References

Syntheses of the monomers: Japanese Patent Application No. H6-56803; Macromolecules, 24, 11-18 (1991); and others.
Synthesis of the homopolymers and the copolymers: Progr. Polym. Sci., 21, 151-208 (1996); Macromol. Chem. Phys., 200, 594-600 (1999); Macromol. Rapid Commun., 26, 1773-1778 (2005); Chemistry Today, 24, 46-49 (2006); J. Polym. Sci., A, Polym. Chem., 42, 3649-3653 (2004); J. Polym. Sci., A, Polym. Chem., 40, 2449-2457 (2002); and others Example 2

Glass Transition Temperature Measurement

The polymer prepared in Example 1 was measured for glass transition temperature with DSC (differential scanning calorimetry). The measurement was made with the scanning temperature of 20-150° C., the rate of temperature increase of 10° C./minute, the rate of temperature decrease of 5° C./minute and the holding time of five minutes. The measurement was done twice with the Tg being 106° C. in both cases.

Using BHT, IPCT complex polymers were also synthesized in which functional groups other than phenyl group were employed as $R_1$ in the formula (II), followed by the Tg measurement with the results as follows: 2-naphthyl group (131° C.); methyl group (81° C.); perfluoroethyl group (71° C.); benzimidozole group (153° C.).

Example 3

Absorption Spectrum Measurement

The polymer synthesized in Example 1 was subjected to an ion-exchange treatment to render the counter ion tetraphenylborate (TPB-), from which was prepared a cast film. The film was coated with poly(vinylalcohol) so as to prevent the influence of oxygen. The resultant was evaluated for absorption spectral change by irradiation with Xe lamp light (>365 nm).

Figure 2:
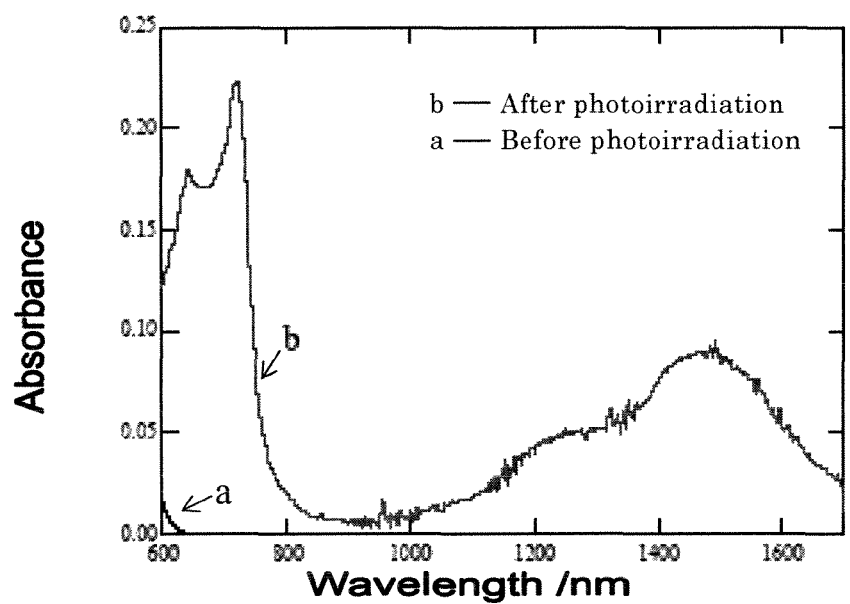
FIG. 2 exemplifies an absorption spectral change observed with a film of the ion-pair charge-transfer complex polymer of the present invention, upon photoirradiation.

FIG. 2 shows the spectral change by the photoirradiation. There is observed an absorption peak in the visible region, developing green color, which is attributable to the short axis transition. An absorption is also observed in the near infrared region (the wavelength region for optical telecommunication), attributable to the long axis transition. A similar spectral change was observed by the electrical reduction through a voltage application.

Example 4

Transient Absorption Spectrum Measurement

A cast film was prepared on a glass substrate by the solvent evaporation method and the transient absorption spectrum measurement was made, with a femtosecond 400 nm laser, in the visible and near infrared regions as observed Example 3.

Immediately after the laser excitation, there was observed the transient absorption in the wavelength ranges of 600-800 nm and 1200-1700 nm due to the formation of radical cations through the photoinduced electron transfer. Time-profiles of the transient absorption at 744 nm and 1440 nm were traced. The decay curve was fitted with a double exponential function to determine the time constant at the respective wavelengths: 2.2 ps at 744 nm and 0.65 ps at 1440 nm. It is thus demonstrated that the IPCT complex polymer of the present invention is suitable for use as an extremely fast photoresponsive material in the optical communication wavelength region.

Example 5

Cyclic Voltammetry Measurement

In order to verify that the IPCT complex polymer of the present invention exhibits electrochromism through redox reaction, cyclic voltammetry measurement was carried out with the polymer synthesized in Example 1.

Figure 3:
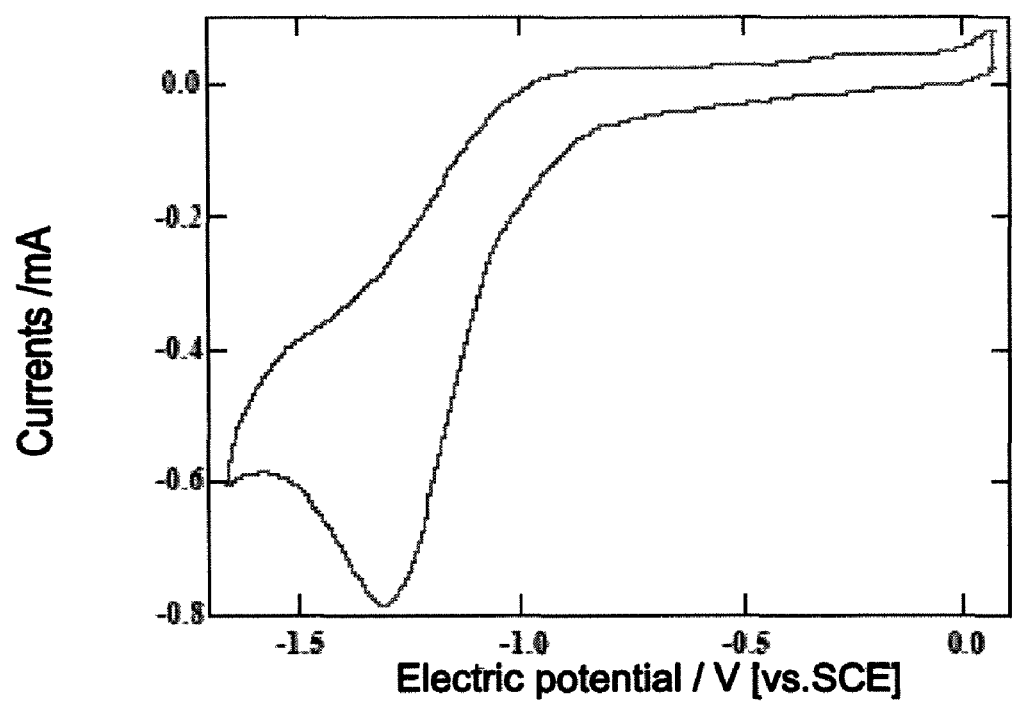
FIG. 3 is an example of a cyclic voltammogram of the ion-pair charge-transfer complex polymer of the present invention.

FIG. 3 shows the cyclic voltammogram of the polymer in acetonitrile. There is observed a reduction peak at −1.30V [vs. SCE]. Assuming the reversibility, the redox potential is calculated to be −1.27V [vs. SCE] or −1.51V [vs. NHE].

INDUSTRIAL APPLICABILITY

The ion-pair charge-transfer complex polymer of the present invention provides a material which is thermally stable and rapidly responsive both optically and electrically in a reversible manner in a wide range of wavelengths, and is thus expected to be utilized in a variety of applications including recording, display, switching, optical modulation and the like.

The invention claimed is:
1. An ion-pair charge-transfer complex polymer, wherein the acceptor is a substituted bipyridinium cation expressed by the general formula (I) below:

[CF1]

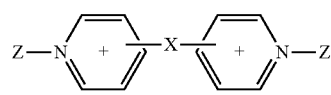

(I)

wherein In the formula (I), X represents a group bonded at the 4- or 2-position relative to the nitrogen atoms of the bipyridinium group and selected from the group consisting of phenyl, biphenyl, thienyl, bithienyl, terthienyl, furyl, fluorenyl, pyrenyl, perylenyl, and vinyl groups, or X may not be present so that the pyridinium groups are directly connected to each other; and Z represents a polymer from the ring-opening polymerization of an oxazoline derivative expressed by the general formula (II) below, or a polymer from the addition polymerization of a vinylether derivative expressed by the general formula (III) below or an indene derivative expressed by the general formula (IV) below;

[CF2]

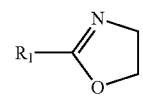

(II)

[CF3]

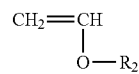

(III)

[CF4]

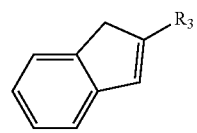

(IV)

wherein In the formula (II) $R_1$ represents a fused ring or non-fused ring functional group (including a substituted functional group) of one through three five-membered or six-membered rings (including heterocyclic rings) connected to each other, or an alkyl group (including a substituted alkyl group) having one through three carbon atoms, in the formula (III) $R_2$ represents a bulky aliphatic polycyclic functional group including adamantil group or tricyclodecyl group, and in the formula (IV) $R_3$ represents hydrogen atom, methyl group or ethyl group.

2. An ion-pair charge-transfer complex polymer as claimed in claim 1, wherein X is bithienyl group, and Z is a polymer from the ring-opening polymerization of an oxazoline derivative expressed by the formula (II).

3. An ion-pair charge-transfer complex polymer as claimed in claim 1, wherein the anion as the donor is selected from the group consisting of chloride, bromide, iodide, tetraphenylborate or derivatives thereof, and a fused ring aromatic molecule composed of one through three five-membered or six-membered rings (including heterocyclic rings) connected to each other and having an anionic substituent.

4. An ion-pair charge-transfer complex polymer as claimed in claim 2, wherein the anion as the donor is selected from the group consisting of chloride, bromide, iodide, tetraphenylborate or derivatives thereof, and a fused ring aromatic molecule composed of one through three five-membered or six-membered rings (including heterocyclic rings) connected to each other and having an anionic substituent.

5. A photoresponsive and electroresponsive material comprising an ion-pair charge-transfer complex polymer as claimed in claim 1.

6. A photoresponsive and electroresponsive material comprising an ion-pair charge-transfer complex polymer as claimed in claim 2.

7. A photoresponsive and electroresponsive material comprising an ion-pair charge-transfer complex polymer as claimed in claim 3.

* * * * *